United States Patent
Cohen et al.

(10) Patent No.: US 10,754,699 B2
(45) Date of Patent: Aug. 25, 2020

(54) REMOTE PROVISIONING OF VIRTUAL APPLIANCES FOR ACCESS TO VIRTUALIZED STORAGE

(75) Inventors: Simona Cohen, Haifa (IL); John Michael Marberg, Haifa (IL); Kenneth Nagin, Mitzpeh Hoshiya (IL)

(73) Assignee: International Business Machines Corporation, Armonk, NY (US)

(*) Notice: Subject to any disclaimer, the term of this patent is extended or adjusted under 35 U.S.C. 154(b) by 999 days.

(21) Appl. No.: 13/567,058

(22) Filed: Aug. 5, 2012

(65) Prior Publication Data

US 2014/0040446 A1 Feb. 6, 2014

(51) Int. Cl.
*G06F 9/54* (2006.01)
*G06F 9/50* (2006.01)

(52) U.S. Cl.
CPC .................. *G06F 9/5055* (2013.01)

(58) Field of Classification Search
CPC ........ G06F 3/067; G06F 8/61; G06F 9/45558; G06F 12/023; G06F 11/1458; G06F 11/2005; G06F 11/2007; G06F 11/2012; G06F 12/0284; G06F 15/173; G06F 17/30082; G06F 17/30289; G06F 2009/4557; G06F 2009/45579; G06F 2201/815; G06F 3/0604; G06F 3/0607;
(Continued)

(56) References Cited

U.S. PATENT DOCUMENTS 5,442,791 A * 8/1995 Wrabetz ............... G06F 9/5072
709/202
7,356,679 B1 * 4/2008 Le ....................... G06F 9/45558
713/1
(Continued)

FOREIGN PATENT DOCUMENTS

EP 2043320 1/2009
JP 2010225109 10/2010
(Continued)

OTHER PUBLICATIONS

Wu et al., "Cloud Storage as the Infrastructure of Cloud Computing", 2010 International Conference on Intelligent Computing and Cognitive Informatics (ICICCI), dated Jun. 22-23, 2010.
(Continued)

*Primary Examiner* — Tonia L Dollinger
*Assistant Examiner* — Linh T. Nguyen
(74) *Attorney, Agent, or Firm* — Michael A. Petrocelli (57) ABSTRACT

Systems and methods for remotely provisioning software to process data stored in a virtualized storage environment are provided. In one embodiment, the method comprises receiving a request, at a first location, for processing data using a software application, wherein the data is stored in a virtualized storage space at a second location and the software application is invoked in a virtualized computing environment at a third location; using a service at the first location to remotely invoke one or more instances of the software application over the virtualized computing environment at the third location; and using the service at the first location to remotely manage transfer of data stored in the virtualized storage space at the second location to the third location.

15 Claims, 8 Drawing Sheets

(58) Field of Classification Search
CPC ...... G06F 3/0647; G06F 3/065; G06F 3/0661;
G06F 3/0665; G06F 3/0683; G06F 8/60;
G06F 9/44505; G06F 9/5077; G06F
12/10; G06F 17/30067; G06F 17/30312;
G06F 17/30575; G06F 2009/45583; G06F
2212/1016; G06F 2212/1048; G06F
2212/151; G06F 3/0608; G06F 3/0631;
G06F 9/45533; G06F 21/629; G06F
2221/2115; G06F 9/4558; G06F
2209/549; G06F 17/30997; G06F 3/1247;
G06F 21/305; G06F 11/1464; G06F
9/455; G06F 2009/45595; G06F
2009/4558; G06F 2009/549; G06F
2212/154; G06F 11/1484; G06F 16/188;
G06F 16/9574; G06F 2009/45562; G06F
3/0662; G06F 9/547; G06F 9/548; H04L
67/10; H04L 67/18; H04L 65/4084; H04L
67/025; H04L 67/2823; H04L 67/306;
H04L 67/1095; H04L 67/42; H04L 67/34;
H04L 67/2814; H04L 41/145; H04L
51/046; H04L 41/08; H04L 69/08; H04L
41/0803; H04L 41/04; H04L 41/0813;
H04L 45/02; H04L 41/12; H04L 41/0886;
H04L 63/0272; H04L 63/0281; H04L
63/10; H04L 67/28; H04L 69/329; H04L
67/288; H04W 4/02
USPC ....... 709/217, 219, 223, 232, 221, 203, 227,
709/246, 202, 238, 226; 707/756;
715/748; 718/1, 104
See application file for complete search history.

(56) References Cited

U.S. PATENT DOCUMENTS

| | | | | |
|---|---|---|---|---|
| 8,464,211 B2* | 6/2013 | Neagu | G06F 8/70 | 717/106 |
| 8,468,455 B2* | 6/2013 | Jorgensen et al. | | 715/733 |
| 8,510,835 B1* | 8/2013 | Bucu et al. | | 726/23 |
| 8,949,726 B2* | 2/2015 | Kominac | G06F 17/30905 | 715/760 |
| 2001/0034733 A1* | 10/2001 | Prompt | G06F 17/30893 | |
| 2001/0044821 A1* | 11/2001 | Dunkin | H04L 67/2814 | 709/202 |
| 2003/0028642 A1* | 2/2003 | Agarwal | G06F 9/505 | 709/226 |
| 2003/0120792 A1* | 6/2003 | Celik | G06F 9/4445 | 709/231 |
| 2006/0129627 A1* | 6/2006 | Phillips | H04L 63/10 | 709/200 |
| 2006/0173873 A1* | 8/2006 | Prompt | G06F 17/30569 | |
| 2007/0124465 A1* | 5/2007 | Malloy | H04L 41/065 | 709/224 |
| 2008/0294642 A1* | 11/2008 | Wilson | G06F 16/95 | |
| 2009/0049200 A1* | 2/2009 | Lin | G06F 17/30569 | 709/246 |
| 2009/0217244 A1 | 8/2009 | Bozak et al. | | |
| 2009/0217263 A1 | 8/2009 | Gebhart et al. | | |
| 2009/0288082 A1* | 11/2009 | Nazeer et al. | | 718/1 |
| 2009/0300149 A1 | 12/2009 | Ferris et al. | | |
| 2009/0323799 A1* | 12/2009 | McDade, Sr. | | 375/240.01 |
| 2010/0057913 A1* | 3/2010 | DeHaan | | 709/226 |
| 2010/0106804 A1* | 4/2010 | He | G06F 17/30165 | 709/219 |
| 2010/0161759 A1* | 6/2010 | Brand | H04L 67/1097 | 709/218 |
| 2010/0333085 A1* | 12/2010 | Criddle | G06F 8/60 | 717/178 |
| 2011/0093847 A1* | 4/2011 | Shah | G06F 9/45558 | 718/1 |
| 2011/0107406 A1* | 5/2011 | Frost | G06F 9/45558 | 726/6 |
| 2011/0209064 A1* | 8/2011 | Jorgensen et al. | G06F 9/455 | 715/733 |
| 2011/0213884 A1 | 9/2011 | Ferris et al. | | |
| 2011/0238239 A1* | 9/2011 | Shuler | G06F 9/5077 | 701/3 |
| 2011/0251992 A1* | 10/2011 | Bethlehem | H04L 12/2863 | 707/610 |
| 2011/0252420 A1 | 10/2011 | Tung et al. | | |
| 2011/0314157 A1* | 12/2011 | Saito | G06F 9/5044 | 709/226 |
| 2012/0054747 A1* | 3/2012 | Waldspurger | G06F 9/545 | 718/1 |
| 2012/0151370 A1* | 6/2012 | Kominac et al. | G06F 3/01 | 715/740 |
| 2012/0180041 A1* | 7/2012 | Fletcher | G06F 9/45558 | 718/1 |
| 2012/0198442 A1* | 8/2012 | Kashyap | G06F 8/61 | 718/1 |
| 2012/0209947 A1* | 8/2012 | Glaser et al. | | 709/217 |
| 2012/0240110 A1* | 9/2012 | Breitgand | G06F 9/45558 | 718/1 |
| 2012/0296960 A1* | 11/2012 | Kreuzer | H04L 67/1097 | 709/203 |
| 2013/0297739 A1* | 11/2013 | Faihe et al. | | 709/217 |
| 2013/0326639 A1* | 12/2013 | Droste | G06F 21/55 | 726/28 |
| 2013/0339958 A1 | 12/2013 | Droste | | |
| 2014/0012867 A1* | 1/2014 | Moss | G06N 3/02 | 707/756 |
| 2014/0245282 A1* | 8/2014 | Keith, Jr. | H04L 67/1095 | 717/171 |

FOREIGN PATENT DOCUMENTS

| | | |
|---|---|---|
| WO | 2007035544 | 9/2006 |
| WO | 2009111799 | 3/2009 |
| WO | 2010085579 | 1/2010 |

OTHER PUBLICATIONS

Zhang et al., "Typical Virtual Appliances: An Optimized Mechanism for Virtual Appliances Provisioning and Management", Journal of Systems and Software, vol. 84, Issue 3, pp. 377-387, dated Mar. 2011.

JumpBox, "JumpBox for SnapLogic Data Integration", Aug. 25, 2009. URL: http://www.jumpbox.com/app/snaplogic.

Factor et al., "Authenticity and Provenance in Long Term Digital Preservation: Modeling and Implementation in Preservation Aware Storage", Proceeding TAPP'09 First workshop on on Theory and practice of provenance, Article No. 6, 2009.

* cited by examiner

REMOTE PROVISIONING OF VIRTUAL APPLIANCES FOR ACCESS TO VIRTUALIZED STORAGE

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to providing a local seamless interface to a remotely provisioned software application to process data that is stored in a virtualized data storage environment.

BACKGROUND

A virtualized computing environment may be implemented to allow a user access or update data stored in a remote location by way of accessing a storage device that is connected to a local computing machine via a wide area communications network, such as the Internet. The above infrastructure, commonly referred to as cloud storage, advantageously helps users access their data from any machine with some limitations.http://en.wikipedia.org/wiki/Server_%28computing %29

For example, to update data stored on a remote storage device, a user must generally download the target data or file (e.g., a Microsoft (MS) Word™ file) from the remote storage device to a local storage device and locally launch a software application (e.g., an MS Word editor) that can read, render and manipulate the data on the local computing machine. Thereafter, the locally stored version of the data is uploaded and stored on the remote storage. All the above actions, typically, require some sort of overt user interaction and knowledge of the various platforms.

Further, in the above scenario, the proper software application (e.g., an MSWord text editor) for accessing a certain type of file (e.g., an MS Word file) or data needs to be pre-installed on the local computing machine. Otherwise, the data may not be properly rendered or manipulated. Moreover, the particular software application must be compatible with the underlying operating system running on the local computing machine to properly operate. For example, a Windows™ MS Word editor would not run on a machine with a MAC OS platform.

To overcome the above dependencies, a system may be implemented to provision a software application on a remote server such that, regardless of the limitations of the local operating system or computing machine, the software application is launched remotely on a virtual operating environment that supports the remote software application as if it was locally launched. Use of remotely provisioned software applications is unfortunately not as intuitive and seamless as software applications that are designed to run locally in their native environment.

For example, a user may be required to download a data file from a remote location, if the file is not locally available, and upload the same file to the server or network on which the remotely provisioned software is running. Most, if not all the above procedures, need to be done either manually or semi-manually by the user and typically require a user to have knowledge of the underlying computing infrastructure. As such, the user may need to learn how to: access the remote storage, download the target data, launch the target software application, etc.

Even further, once the target data is manipulated, a user may need to download the updated data files, from the location where the remote software application is running, back to the local machine and then take additional step to upload the data to a remote data storage space of choice, making the proper transformations to ensure that the updated data files are compatible for storage at the destination. Data security and privacy are also consistent threats in the scenarios defined above as the data has to transition through multiple networks and platforms.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for remotely provisioning software to process data stored in a virtualized storage environment are provided. In one embodiment, the method comprises receiving a request, at a first location, for processing data using a software application, wherein the data is stored in a virtualized storage space at a second location and the software application is invoked in a virtualized computing environment at a third location; using a service at the first location to remotely invoke one or more instances of the software application over the virtualized computing environment at the third location; and using the service at the first location to remotely manage transfer of data stored in the virtualized storage space at the second location to the third location where the one or more instances of the software application are invoked, so that the data is locally processed by the one or more instances of the software application at the third location.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
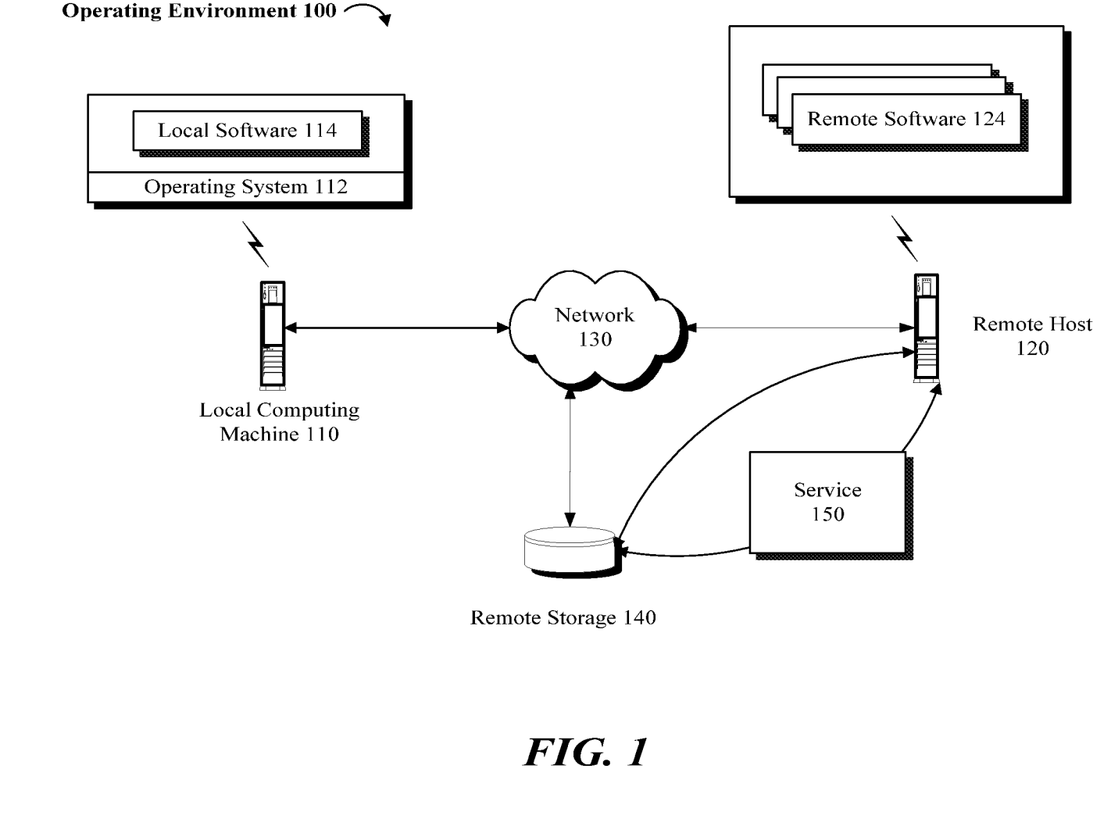
FIG. 1 illustrates an exemplary operating environment in accordance with one or more embodiments, wherein data requests submitted by a local machine is transformed and rendered using remotely provisioned software.

Referring to FIG. 1, an operating environment 100 is provided in which a local computing machine 110 is connected to a remote storage 140 and a remote host 120 over network 130. Network 130 may be a wide area communication network such as the Internet allowing data communication among the components and systems connected to it. For example, a user may use local computing machine 110 to launch local software 114 over an operating system 112 to access and update data stored on remote storage 140.

In one embodiment, instead of launching local software 114, local computing machine 110 may use a service 150 that is implemented to seamlessly manage the launching of remote software 124 over a remote host 120, as well as the transfer and transformation of data stored on remote storage 140, so that remote software 124 may properly access and manipulate the target data. Although not shown in FIG. 1, service 150 may be provisioned over computing machine 110 or an independent server that is either locally or remotely connected to computing machine 110.

Figure 2:
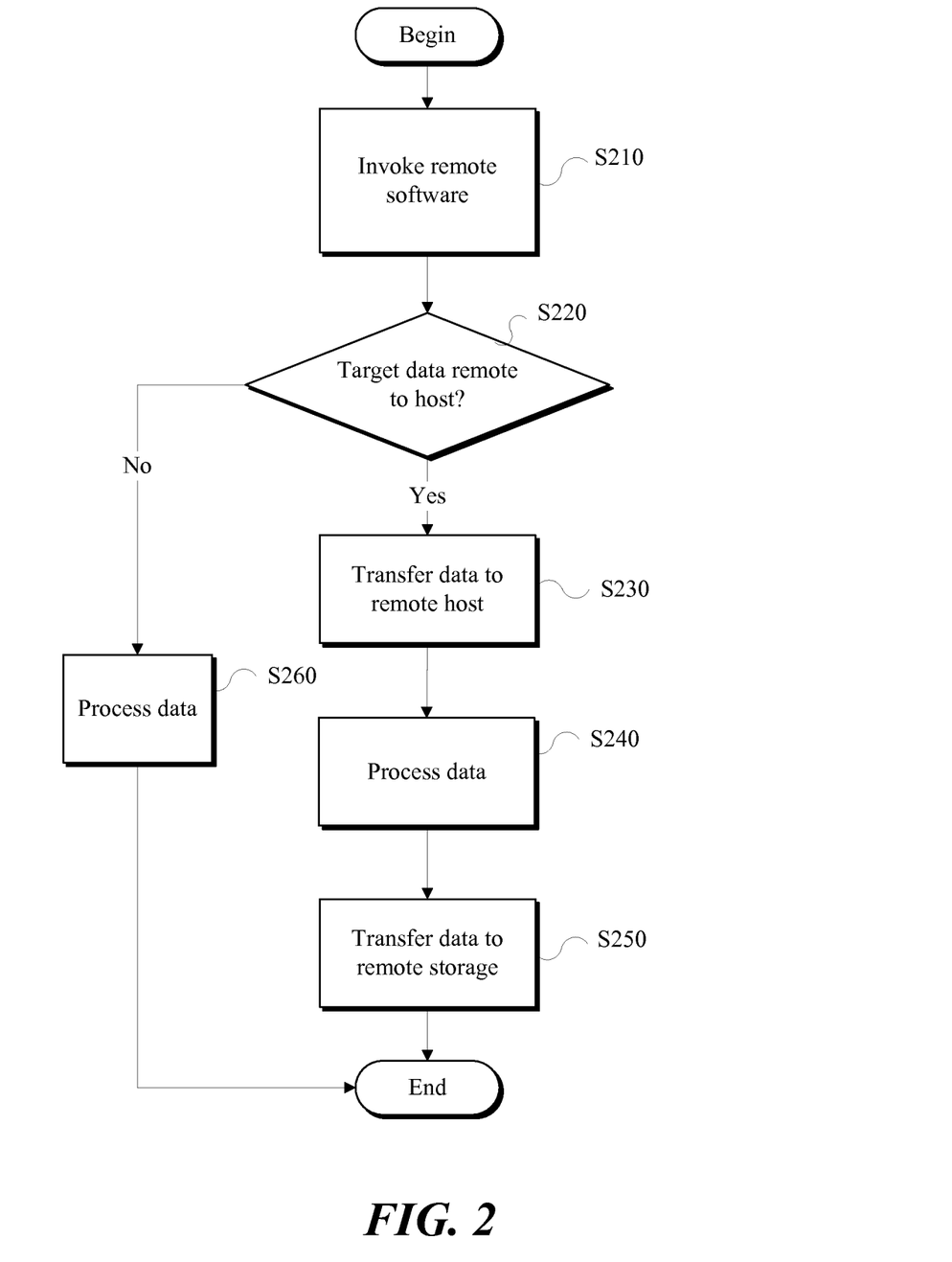
FIG. 2 is an exemplary flow diagram of a method of managing the rendering of requested data in a virtualized computing environment, in accordance with one embodiment

Referring to FIGS. 1 and 2, in response to receiving a request from computing machine 110, for accessing or manipulating target data, service 150 dynamically invokes one or more instances of remote software 124 on remote host 120 (S210). If it is determined that the location of the target data is remote to the remote host 120 (e.g., if the target data is stored on local computing machine 110 or on remote storage 140), then service 150 seamlessly transfers the data to remote host 120 where the remote software 124 is hosted (S220-S230).

On the other hand, if the target data is local to the remote host 120, the data may be processed by the one or more instances of remote software 124 without the need for service 150 to manage any data transfer (S260). If needed, in addition to managing data transfer to remote host 120, service 150 may also determine if data is to be transformed into a different format, type or structure. For example, service 150 may transform the data file directory or file format (e.g., create directories and reorganize the storage objects) so that the transferred data is compatible for processing by the remote software 124.

Remote software 124 may be invoked by way of instantiating one or more virtual appliance (VA) instances on remote host 120. A VA may be a virtual machine image (VM image) with an operating system and application packaged together as a pre-installed system image for a virtualized environment such as VMware or Xen. Remote host 120 may be a server system such as Amazon EC2, Rackspace Cloud Server or Openstack Nova, for example. In one embodiment, the VA instances are utilized to process the target data (S240) by way of rendering the data on computing machine 110 and allowing a user to manipulate[M] the data by way of commands submitted securely over network 130.

Once the data processing is complete, service 150 may cause a data transfer (S250), and if needed the transformation, of the updated data to remote storage 140, desirably in a data format supported by remote storage 140. Accordingly, service 150 automates the provisioning of remote software 124 on remote host 120 with the target data remaining ultimately preserved in remote storage 140 after it is manipulated by the user. In one implementation, the user interacts with instruments provided by service 150, desirably, using a single transaction, due to service 150 having an understanding of the topology of the virtual environment in which remote storage 140 and remote host 120 reside.

As provided in further detail below, service 150 may also be implemented to support filtering capabilities to promote data security as target data is being transformed and transferred over network 130. For example, in one implementation, data requested by a user may be associated with an identifier (e.g., a user ID) that indicates that the data is to be accessible securely by the particular user. In addition, the requested data may be associated with additional identifiers that indicate the type of software that may be used for accessing and rendering the data to the user.

In an example scenario, the identifier associated with a target file that is the subject of a write operation may indicate that the target file is an MS Word file. If so, then service 150 may instantiate a VA over remote host 120, wherein the VA is suitable for opening an MS Word file and allowing a user to edit the content of the file. Service 150 may also invoke predefined initialization commands or scripts on the VA, copy the data from remote storage 140 to remote host where the VA is being executed, invoke predefined conclusion commands or scripts on the VA, and return to the user a link to the VA.

Figure 3A:
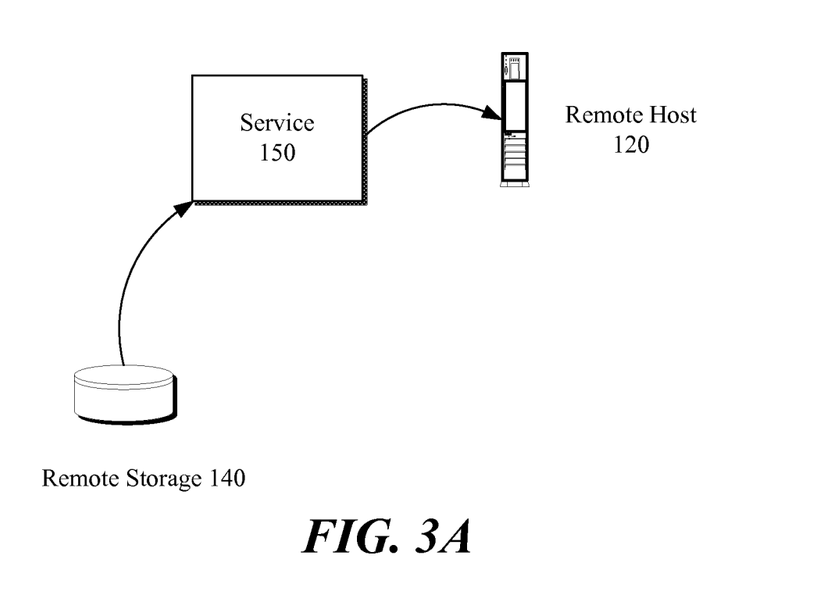
FIGS. 3A and 3B show example scenarios for orchestrating the transition of data between virtualized storage servers and virtualized appliance servers, in accordance with one embodiment.
Figure 3B:
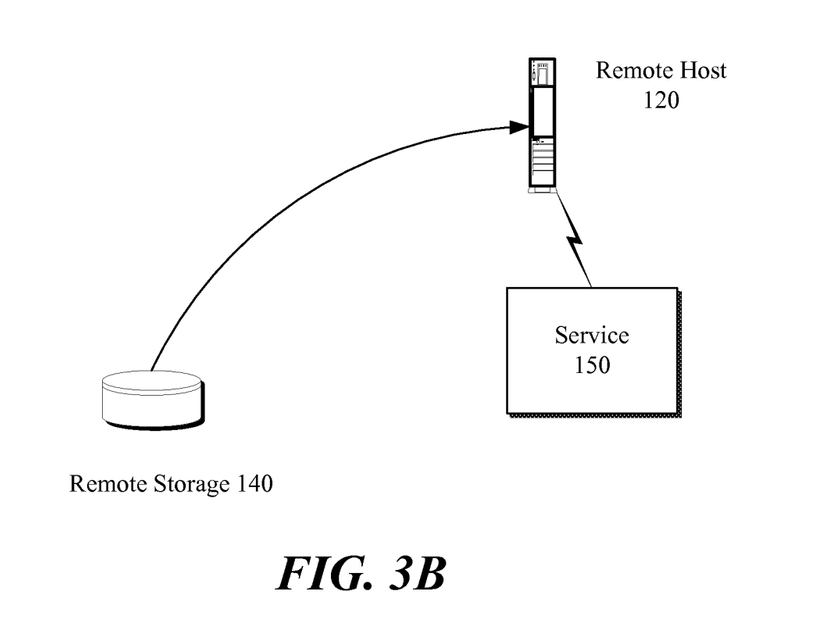

Depending on implementation, different methods may be utilized to copy the data from remote storage 140 to remote host 120 as provided in further detail below. Referring to FIG. 3A, by way of example, a service copy method is illustrated in which service 150, upon receiving a data request, copies the target data from remote storage 140 to storage space local to service 150 and then pushes the data to remote host 120 where the VA resides. Referring to FIG. 3B, a VA copy method is illustrated in which service 150 instead invokes a predefined function in the VA to copy the data from remote storage 140 to remote host 120.

Depending on implementation, in the service copy method, service 150 may apply certain filters to the data before the data is pushed to remote host 120 to maintain security and, for example, prevent data that is not authorized for access by the VA to be transferred to remote host 120. In contrast to the service copy method, the VA copy method is more efficient in that the target data is copied directly from the remote storage 140 to remote host 130. Additional optimization may be achieved under the VA copy method by collocating the VA and data on the same host, for example, to reduce data copy distance.

A variation of service copy method may be implemented by way of utilizing a secondary service (not shown) to transfer the target data from remote storage 140 to remote host 120. Such use of an alternate or secondary service may be implemented so that service 150 relies on the secondary service to upload the target data from remote storage 140 to a storage space local to the secondary service, before data is transferred to remote host 120. This latter implementation is suitable in scenarios where the filtering and data security are outside of service 150 immediate control.

In exemplary implementations, multiple virtualized computing environments from multiple vendors may be utilized to provide a heterogeneous environment with interoperability across a computing space. For example jclouds an open source Java library may be utilized to provide cloud-agnostic abstractions with stable implementations of cloud compute (e.g., ComputeService) and cloud storage (e.g., BlobStore). jclouds may be used to provide the service 150 to help create a VA's virtual machine instances. Further, jclouds ssh compute service support may be used to initialize, copy data, and conclude VA provisioning.

In one example embodiment, jclouds BlobStore interface may be utilized to copy the target data from remote storage 140. jclouds may also provide the VA's public IP. The public IP may be used to return the ssh command to access the VA. In one example, for MS Windows Vas, a remote desktop file may be implemented that the user may, for example, select to open the MS Windows remote desktop running on the compute cloud.

Advantageously, using the above exemplary embodiments, service 150 may provide the following features: (1) a generic user interface that hides the complexity of interacting with multiple heterogeneous compute and storage clouds; (2) cloud elasticity by creating multiple instances of the same VA; (3) VA collocation with data to be processed, and (4) parallel large volume data transformations. Data transformation may be done on a large volume of data of the same format, for example, as the volume of data to be transformed increases.

In one example, service 150 is incorporated into a virtual user application, where collocation may be accomplished by creating VA instances in the same region as the cloud storage provider. When the service is part of a cloud provider's infrastructure, the VA may be further localized by collocating the VA on the same subnet or even host where the data resides. When allowing VA direct access to the storage cloud, service 150 may enhance the underlying storage cloud's authorization and security model to ensure that the VA's user(s) access to storage is restricted to the data that it is permitted to read or write.

As provided earlier, in some embodiments, service 150 automatically transforms data when the virtual storage data organization or format is not compatible with the VA. For instance, Amazon S3 organizes its data with buckets, objects and folders. The typical VA operating system is organized as files and directories. Copying a folder directly from S3 to a VA, for example, may not create a directory. Thus, service 150 creates directories and reorganizes the other storage objects accordingly. When writing files and directories back to Amazon S3, the conversion process may be reversed. It is noteworthy that the remote data transfer, provisioning, and processing may be implemented to be transparent to the user.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
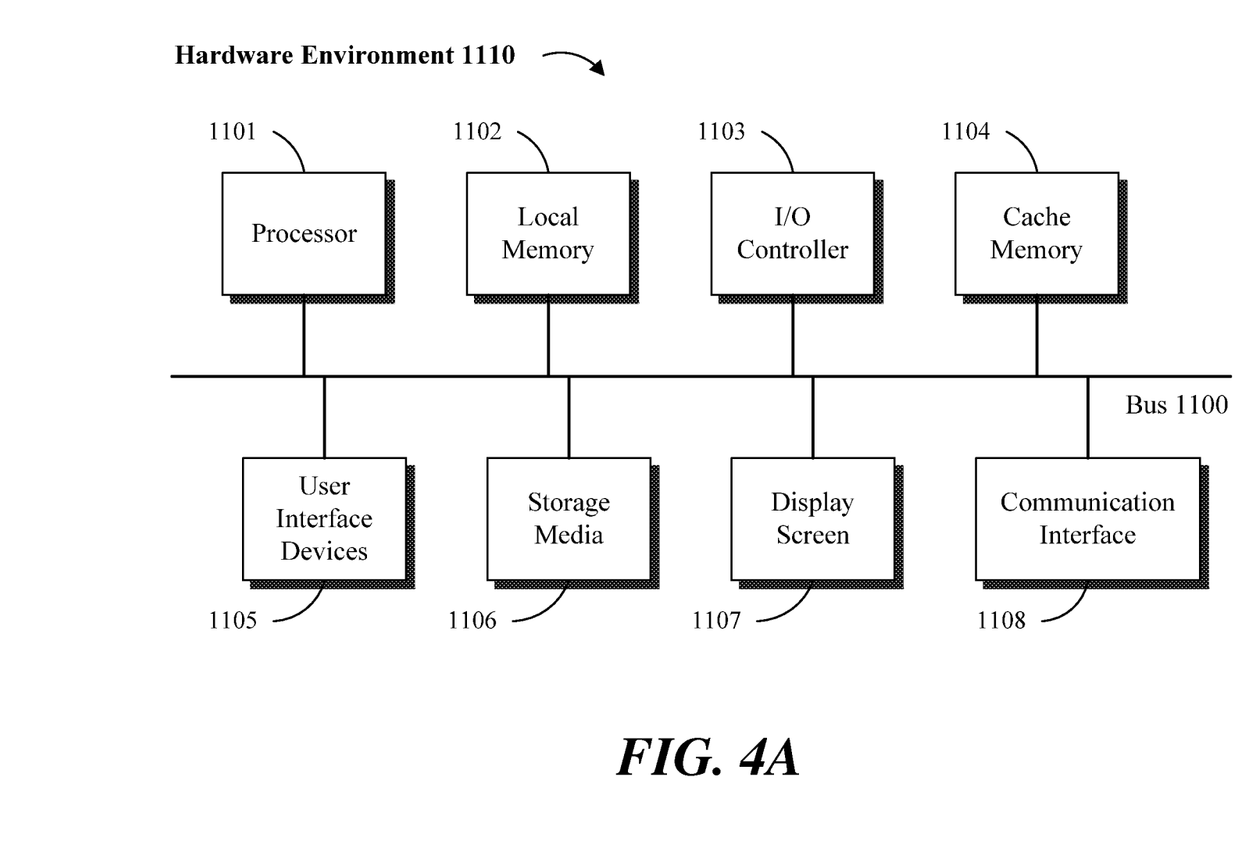
FIGS. 4A and 4B are block diagrams of hardware and software environments in which the disclosed systems and methods may operate, in accordance with one or more embodiments.
Figure 4B:
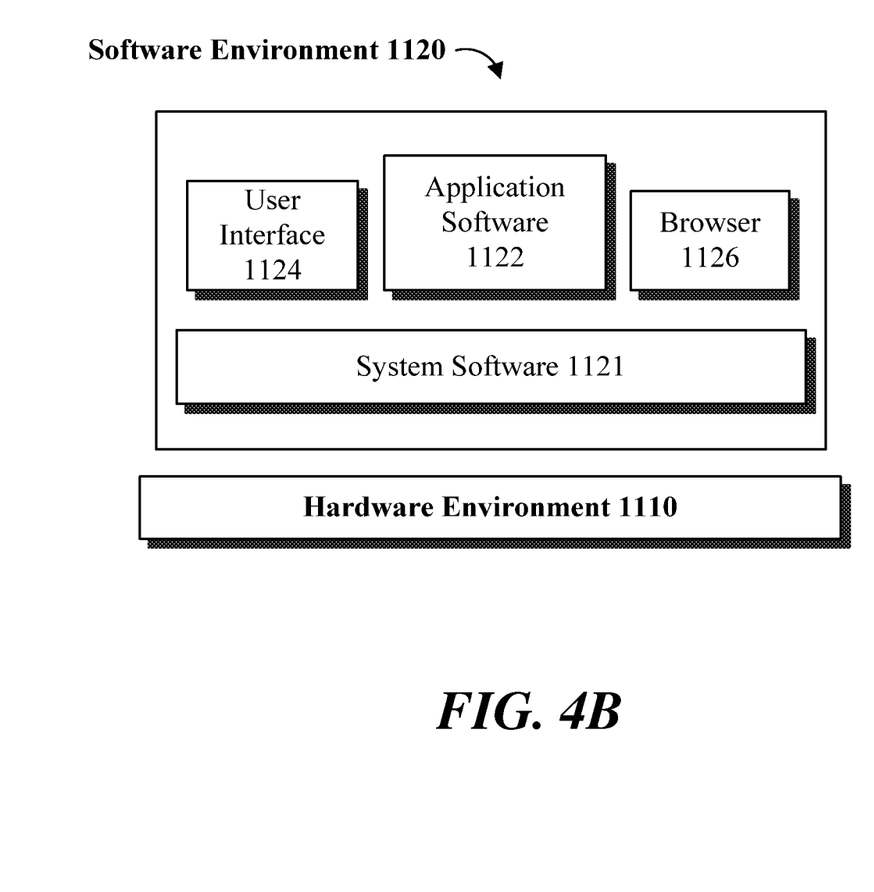

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 5A:
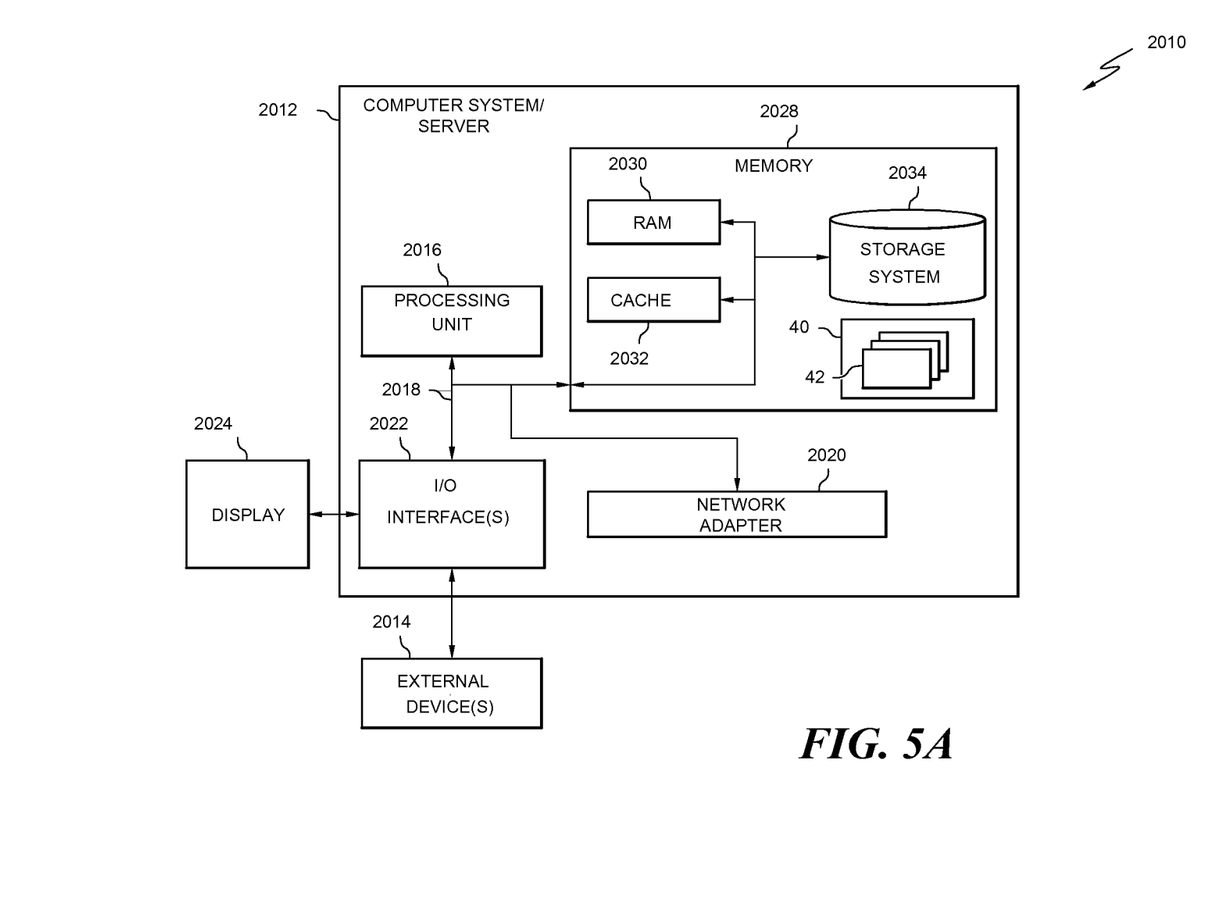
FIGS. 5A, 5B and 5C depict one or more nodes and abstraction model layers in an exemplary network environment that supports a virtual infrastructure, in accordance with one or more embodiments.

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
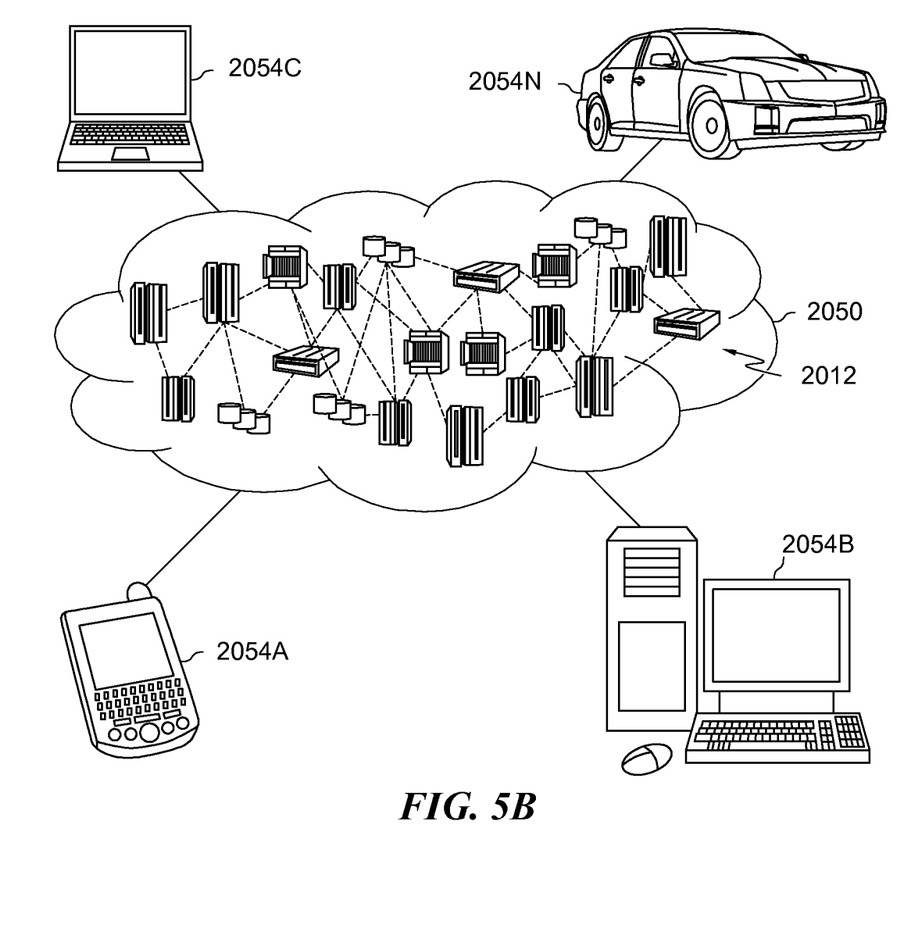

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
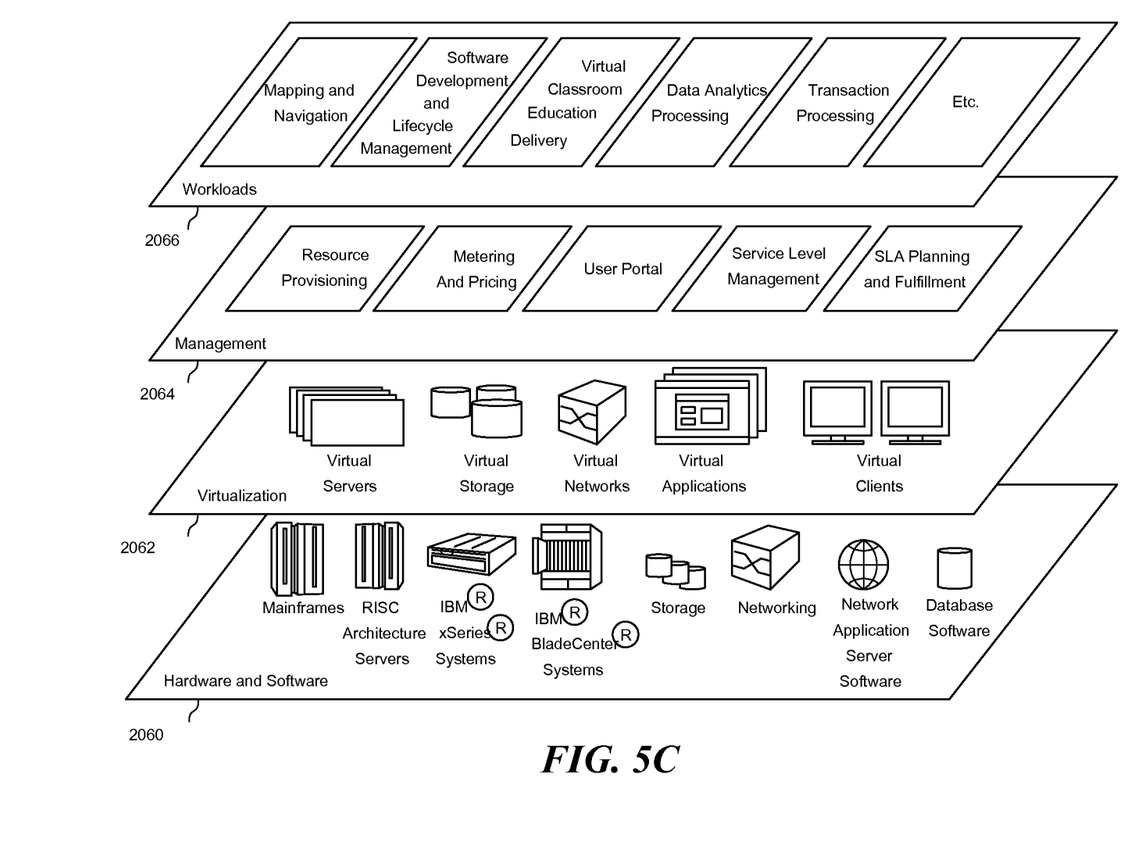

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for remotely provisioning software to process data stored in a virtualized storage environment, the method comprising:

receiving a request, by a service at a first location, for processing data stored in remote storage at a second location, the request to process the data originating from a local computing device that is local to a user, wherein the service at the first location and the remote storage storing the data at the second location are remote from the local computing device;

responsive to receiving the request, the service at the first location automatically interfacing with a host computing device at a third location that is remote from the local computing device to instantiate one or more instances of a virtual appliance on the host computing device, the one or more instances of the virtual appliance provisioned to manipulate the data via remote software executing on the one or more instances of the virtual appliance, the one or more instances of the virtual appliance further provisioned to send, to the local computer device, a link to the remote software executing on the one or more instances of the virtual appliance;

the service at the first location, based on a topology of a heterogeneous computing environment including computing hardware and software at the second location and computing hardware and software at the third location, automatically managing transfer of the data stored on the remote storage at the second location to the one or more instances of the virtual appliance provisioned on the host computing device at the third location and executing the remote software, the user being able to access and manipulate the data stored on the remote storage at the second location using the remote software executing on the one or more instances of the virtual appliance provisioned on the host computing device at the third location; and responsive to the service at the first location determining that the remote software executing at the third location made changes to the data transferred from the remote storage at the second location, the service at the first location automatically updating the data stored on the remote storage at the second location to reflect the changes.

2. The method of claim 1 further comprising using the service at the first location to request processing of the data transferred to the third location by the one or more instances of the remote software.

3. The method of claim 1, further comprising:
responsive to the service at the first location determining that the remote storage at the second location storing the data is not collocated with the one or more instances of the virtual appliance provisioned on the host computing device at the third location, the service automatically transferring the data from the remote storage at the second location to the one or more instances of the virtual appliance provisioned on the host computing device at the third location, the service transferring the data from the remote storage at the second location to the service at the first location and from the service at the first location to the host computing device at the third location.

4. The method of claim 1, further comprising:
responsive to the service at the first location determining that the remote storage at the second location storing the data is collocated with the one or more instances of the virtual appliance provisioned on the host computing device at the third location, the service automatically invoking a predefined function to cause the one or more instances of the virtual appliance to copy the data directly from the remote storage at the second location.

5. The method of claim 1, wherein the service utilizes a secondary service located at a fourth location to manage the transfer of the data from the remote storage at the second location to the host computing device at the third location.

6. The method of claim 1, wherein the data stored on the remote storage at the second location is identified by way of an identifier as being in a first format such that the service based on said identifier determines a first type of virtual appliance to instantiate on the host computer device at the third location, wherein the first type of virtual appliance is compatible with the first format.

7. The method of claim 6, wherein the service manages data transfer and data format transformation of the data between the second location and the third location to ensure secure data transfer and data compatibility among the one or more instances of the virtual appliance provisioned on the host computing device at the third location and the data stored on the remote storage at the second location.

8. A system for remotely provisioning software to process data stored in a virtualized storage environment, the system comprising:
one or more processors;
one or more computer readable data storage devices;
program instructions stored on the one or more computer readable storage devices for execution by at least one of the one or more processors, the program instructions when executed by the at least one of the one or more processors causing the system to:
receiving a request, by a service at a first location, for processing data stored in remote storage at a second location, the request to process the data originating from a local computing device that is local to a user, wherein the service at the first location and the remote storage storing the data at the second location are remote from the local computing device;
responsive to receiving the request, the service at the first location automatically interfacing with a host computing device at a third location that is remote from the local computing device to instantiate one or more instances of a virtual appliance on the host computing device, the one or more instances of the virtual appliance provisioned to manipulate the data via remote software executing on the one or more instances of the virtual appliance, the one or more instances of the virtual appliance further provisioned to send, to the local computer device, a link to the remote software executing on the one or more instances of the virtual appliance;
the service at the first location, based on a topology of a heterogeneous computing environment including computing hardware and software at the second location and computing hardware and software at the third location, automatically managing transfer of the data stored on the remote storage at the second location to the one or more instances of the virtual appliance provisioned on the host computing device at the third location and executing the remote software, the user being able to access and manipulate the data stored on the remote storage at the second location using the remote software executing on the one or more instances of the virtual appliance provisioned on the host computing device at the third location; and
responsive to the service at the first location determining that the remote software executing at the third location made changes to the data transferred from the remote storage at the second location, the service at the first location automatically updating the data stored on the remote storage at the second location to reflect the changes.

9. The system of claim 8, further comprising program instructions that when executed by the at least one of the one or more processors causing the system to:
use the service at the first location to request processing of the data transferred to the third location by the one or more instances of the remote software.

10. A computer program product comprising a non-transitory computer readable data storage medium having a computer readable program, wherein the computer readable program when executed on a computer causes the computer to:
receiving a request, by a service at a first location, for processing data stored in remote storage at a second location, the request to process the data originating from a local computing device that is local to a user, wherein the service at the first location and the remote storage storing the data at the second location are remote from the local computing device;
responsive to receiving the request, the service at the first location automatically interfacing with a host computing device at a third location that is remote from the local computing device to instantiate one or more instances of a virtual appliance on the host computing device, the one or more instances of the virtual appliance provisioned to manipulate the data via remote software executing on the one or more instances of the virtual appliance, the one or more instances of the virtual appliance further provisioned to send, to the local computer device, a link to the remote software executing on the one or more instances of the virtual appliance;
the service at the first location, based on a topology of a heterogeneous computing environment including computing hardware and software at the second location and computing hardware and software at the third location, automatically managing transfer of the data stored on the remote storage at the second location to the one or more instances of the virtual appliance provisioned on the host computing device at the third location and executing the remote software, the user being able to access and manipulate the data stored on the remote storage at the second location using the remote software executing on the one or more instances of the virtual appliance provisioned on the host computing device at the third location; and responsive to the service at the first location determining that the remote software executing at the third location made changes to the data transferred from the remote storage at the second location, the service at the first location automatically updating the data stored on the remote storage at the second location to reflect the changes.

11. The method of claim 3, further comprising using the service at the first location to apply filters to the data prior to transferring the data from the first location to the third location, wherein the filters prevent data that is not authorized for access by the one or more virtual appliance instances from being sent to the third location.

12. The method of claim 3, further comprising:

responsive to the service determining that the data transferred from the remote storage at the second location to the service at the first location is not compatible with the one or more instances of the virtual appliance provisioned on the host computing device at the third location, the service converting the data such that it is compatible with the one or more instances of the virtual appliance prior to transferring the data from the service at the first location to the one or more instances of the virtual appliance provisioned on the host computing device at the third location.

13. The computer program product of claim 10, wherein the data transferred to the third location is processed by the one or more instances of the remote software in response to requests received by the service at the first location.

14. The computer program product of claim 10, further comprising program instructions that when executed on the computer cause the computer to:

responsive to the service at the first location determining that the remote storage at the second location storing the data is not collocated with the one or more instances of the virtual appliance provisioned on the host computing device at the third location, the service automatically transferring the data from the remote storage at the second location to the one or more instances of the virtual appliance provisioned on the host computing device at the third location, the service transferring the data from the remote storage at the second location to the service at the first location and from the service at the first location to the host computing device at the third location.

15. The computer program product of claim 10, further comprising program instructions that when executed on the computer cause the computer to:

responsive to the service at the first location determining that the remote storage at the second location storing the data is collocated with the one or more instances of the virtual appliance provisioned on the host computing device at the third location, the service automatically invoking a predefined function to cause the one or more instances of the virtual appliance to copy the data directly from the remote storage at the second location.

* * * * *